Aug. 2, 1927.
A. M. LANE
1,637,753
TIRE STRUCTURE
Filed Nov. 1, 1926
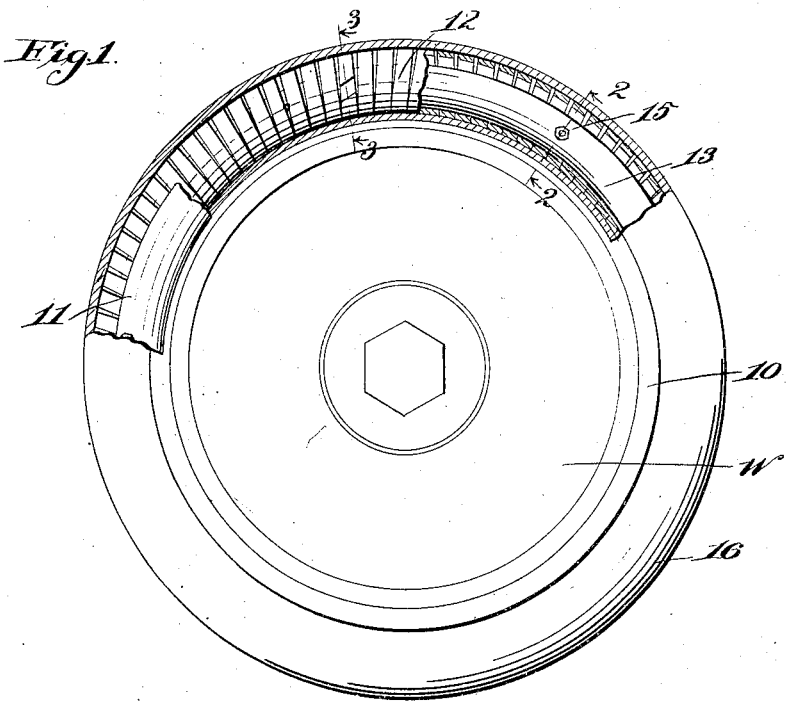
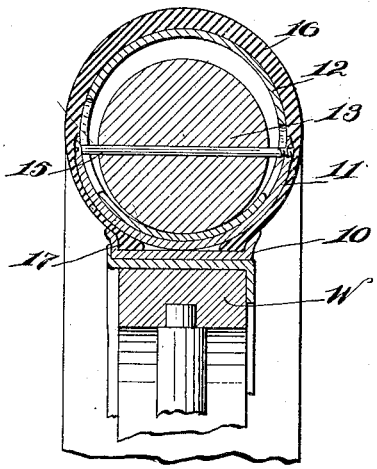
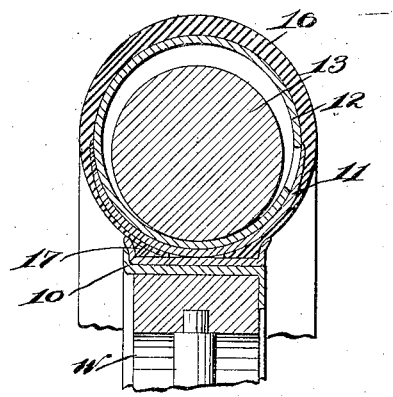
Inventor
A. M. Lane
by Hazard and Miller
Attorneys Patented Aug. 2, 1927.

1,637,753

UNITED STATES PATENT OFFICE.

ANNIE M. LANE, OF LOS ANGELES, CALIFORNIA.

TIRE STRUCTURE.

Application filed November 1, 1926. Serial No. 145,523.

This invention relates to improvements in resilient tires used upon vehicles.

An object of the invention is to provide a resilient tire of novel, simple, and durable construction of adequate resiliency so as to favorably compare with the pneumatic tire but have the advantage over a pneumatic tire in that it is not subject to punctures, blow-outs, leaks or the like.

A further object of the invention is to provide a resilient tire for vehicles consisting essentially of a rim channel shape in cross section in which a helical spring is arranged, a portion of which projects from the rim, a core fitting in the spring having its inside surface bearing against the inside of the spring to hold it against the rim, and a casing enclosing the spring and portions of the rim which casing is adapted to be mounted directly upon a supporting rim.

With the foregoing and other objects in view which will be made manifest in the following detailed description and specifically pointed out in the appended claims, reference is had to the accompanying drawings wherein:

Figure 1 is a side elevation of the vehicle wheel to which the improved resilient tire has been applied, parts of the tire being broken away and shown in section.

Fig. 2 is a vertical section taken substantially upon the line 2—2 upon Fig. 1.

Fig. 3 is a vertical section taken upon the line 3—3 upon Fig 1.

Referring to the accompanying drawings wherein similar reference characters designate similar parts throughout, the improved tire is shown as having been mounted upon a vehicle wheel W. On the felly of the wheel there is shown a supporting rim 10 which may be made of any conventional or preferred construction and the rim illustrated upon the drawing is one which is transversely split so that by causing the ends of the rim to overlap each other the rim can be contracted for application and removal of the tire. The tire consists of an annular rim 11 which is channel shape in cross section, being in the form of approximately one half of a circle as shown upon Figures 2 and 3. A helical spring 12, which is formed of sheet steel, fits within the rim 11 and has its outer side projecting out of the rim. This helical spring is flexed and is bent around the rim 11 so that the inner portions of its convolutions are arranged in an abutting edge to edge relation as shown upon Figure 1, the flexing of the spring causes the outer portions of the convolutions to be spaced from each other. The ends of the spring can be connected together such as by welding or may be left unconnected as shown upon the drawing. When they are unconnected these ends are preferably so arranged as to be against the rim 11.

Within the spring 11 there is a ringlike core 13 which is circular in cross section and which has a cross sectional diameter somewhat smaller than that of the helical spring 12. The inside diameter of the core is such that it will hold the inside of the spring 12 firmly against the bottom of the rim 11. The core 13 may be formed of any desirable material such as wood, compressed fiber, composition, or metal; it may be formed of sections but in the preferred form it is split so that the spring 12 can be caused to slide thereover in assembling the tire.

Bolts 15 extend across the rim 11 and serve to connect the sides of this rim. These bolts extend over the core 13 and also between the convolutions of the spring 12. They serve to strengthen the rim 11 and to hold the core 13 and the spring 12 in position.

A tire casing 16 which may be of any desired or preferred construction encloses the spring 12 and the rim 11 and has its beads 17 fitting upon the supporting rim 10.

The operation and advantages of the improved tire are as follows:

The spring 12 is of such size as to support the weight of a vehicle for which the tire has been designed. However, it affords a considerable degree of resiliency comparing favorably with the conventional pneumatic tire. As the inner portions of the convolutions are abutting each other and the spring is held against longitudinal movement by the bolts 15, creeping of the spring within the casing 16 is effectively prevented. The outer portions of the convolutions of the springs being spaced over each other are free to give under compressive stresses and also to move slightly in a longitudinal direction. It will be noted that as no inner tube, or its equivalent, is used in the construction of the improved tire that the tire is not subject to punctures or blow-outs. Casing 16 provides the wearing surface for the improved tire and the spring 12 absorbs the shocks. If, however, an obstruction should be struck with a considerable force the outside surface of the core 13 serves as a stop or limit for the collapsing movement of the convolutions of the spring so that the convolutions cannot be bent inwardly beyond this limit which might cause them to become permanently sprung. In this way all the convolutions cannot become sprung and will always return to their normal condition. It will be understood that the improved tire can be mounted upon any conventional type of supporting ring 10 which may or may not be transversely split as above described.

From the above described construction it will be appreciated that a novel tire is produced which is of simple and durable construction, having adequate resiliency and which employs a spring for holding the casing in inflated position so that the tire cannot be punctured or caused to blow-out.

It will be understood that various changes may be made in the details of construction without departing from the spirit and scope of the invention as defined by the appended claims.

I claim:

1. A resilient tire comprising a circular rim channel shape in cross section, a helical spring fitting inside the rim and projecting outwardly therefrom, a core disposed within the spring having such inside diameter that it will hold the spring against the rim, the outside of the rim being disposed in spaced relation to the outside of the spring, means connecting sides of the rim through the core and spring, the inner portions of the convolutions of the spring being arranged in abutting relation, and the outer portions of the convolutions being spaced over each other, and a casing fitting over the spring and rim.

2. A resilient tire comprising a supporting rim, a second rim channel shape in cross section disposed thereabout, a helical spring fitting in the second rim and projecting outwardly therefrom, a ring-like core disposed within the spring having a smaller cross sectional diameter than that of the spring, said core serving to hold the inside of the spring against the second rim, bolts connecting the sides of the second rim through the core and spring and a casing fitted over the spring and second rim having beads fitting upon the supporting rim.

In testimony whereof I have signed my name to this specification.

ANNIE M. LANE.